(12) United States Patent
Marsala et al.

(10) Patent No.: US 9,611,736 B2
(45) Date of Patent: Apr. 4, 2017

(54) BOREHOLE ELECTRIC FIELD SURVEY WITH IMPROVED DISCRIMINATION OF SUBSURFACE FEATURES

(71) Applicants: Saudi Arabian Oil Company, Dhahran (SA); Groundmetrics, Inc., San Diego, CA (US)

(72) Inventors: Alberto Marsala, Bergamo (IT); Andrew Dennis Hibbs, LaJolia, CA (US)

(73) Assignees: Saudi Arabian Oil Company, Dhahran (SA); Groundmetrics, Inc., San Diego, CA (US)

( * ) Notice: Subject to any disclaimer, the term of this patent is extended or adjusted under 35 U.S.C. 154(b) by 127 days.

(21) Appl. No.: 14/013,681

(22) Filed: Aug. 29, 2013

(65) Prior Publication Data

US 2015/0061684 A1 Mar. 5, 2015

(51) Int. Cl.
*G01V 3/28* (2006.01)
*E21B 49/00* (2006.01)
(Continued)

(52) U.S. Cl.
CPC .............. *E21B 49/00* (2013.01); *G01V 3/20* (2013.01); *G01V 3/24* (2013.01)

(58) Field of Classification Search
CPC . G01V 3/28; G01V 3/30; G01V 3/083; G01V 3/12; G01V 1/22; G01V 3/00;
(Continued)

(56) References Cited

U.S. PATENT DOCUMENTS 3,798,534 A 3/1974 Schuster
4,290,020 A 9/1981 Hansen et al.
(Continued)

FOREIGN PATENT DOCUMENTS

EP 2253971 A1 11/2010
WO 2012177349 A1 12/2012

OTHER PUBLICATIONS

Marsala et al., "First Borehole to Surface Electromagnetic Survey in KSA: reservoir mapping & monitoring at a new scale", SPE Annual Technical Conference and Exhibition held in Denver, Colorado, Oct. 30-Nov. 2, 2011, pp. 1-10, SPE 146348.
(Continued)

*Primary Examiner* — Son Le
*Assistant Examiner* — Akm Zakaria
(74) *Attorney, Agent, or Firm* — Bracewell LLP; Constance G. Rhebergen; Albert B. Kimball, Jr.

(57) ABSTRACT

Errors produced in a borehole to surface electromagnetic (BSEM) survey by near surface electrical anomalies on the estimates of formation properties are reduced. The effects of variations in subsurface electrical resistivity near the surface are separated from electrical resistivity changes at locations in the formations of interest far from the measurement region. A survey system includes one or more electrodes to inject electrical current at formation depth within a borehole, one or more counter electrodes which collect such current on the surface of the earth, and one or more electrodes to inject current on the surface. A transmitter is selectively connectable to different sets of the electrodes to cause a current to flow between the selected electrode sets. The resultant fields from the current flow are sensed and processed. The effects of near surface anomalies are detectable in the data and removable from the survey data of interest regarding the
(Continued)

formations. The survey data more accurately indicates formation features or properties of interest.

13 Claims, 7 Drawing Sheets

(51) Int. Cl.
*G01V 3/20* (2006.01)
*G01V 3/24* (2006.01)

(58) Field of Classification Search
CPC .. G01V 3/18; G01V 3/26; E21B 47/00; E21B 47/122
USPC .......................................................... 324/355
See application file for complete search history.

(56) References Cited

U.S. PATENT DOCUMENTS

| | | | |
|---|---|---|---|
| 4,392,109 A | 7/1983 | Warner | |
| 4,642,570 A * | 2/1987 | Sternberg et al. | 324/366 |
| 4,875,015 A | 10/1989 | Ward | |
| 5,563,513 A | 10/1996 | Tasci et al. | |
| 5,892,362 A * | 4/1999 | Warren | G01V 3/28 324/339 |
| 6,426,625 B1 * | 7/2002 | Samworth et al. | 324/373 |
| 7,333,893 B2 | 2/2008 | Burtz et al. | |
| 8,014,988 B2 | 9/2011 | Wahrmund et al. | |
| 8,188,749 B2 | 5/2012 | Wilt et al. | |
| 8,321,160 B2 | 11/2012 | Bryant et al. | |
| 2003/0050759 A1 * | 3/2003 | Srnka et al. | 702/7 |
| 2006/0028208 A1 * | 2/2006 | Strack et al. | 324/355 |
| 2009/0005992 A1 | 1/2009 | Alumbaugh et al. | |
| 2010/0198519 A1 | 8/2010 | Wilt et al. | |
| 2010/0259267 A1 * | 10/2010 | Rosthal et al. | 324/339 |
| 2010/0259268 A1 | 10/2010 | Zhang et al. | |
| 2010/0271032 A1 * | 10/2010 | Helwig | 324/365 |
| 2012/0268135 A1 | 10/2012 | Marsala et al. | |

OTHER PUBLICATIONS

International Search Report and Written Opinion for related PCT application PCT/US2014/049533 dated Mar. 13, 2015.

* cited by examiner

BOREHOLE ELECTRIC FIELD SURVEY WITH IMPROVED DISCRIMINATION OF SUBSURFACE FEATURES

BACKGROUND OF THE INVENTION

1. Field of the Invention

The present invention relates to discrimination of features at depth within the earth from features close to the surface during electromagnetic surveying by injection of electrical current into the earth with selectable different sets of electrodes.

2. Description of the Related Art

Electromagnetic (EM) geophysical soundings probe electrical resistivity, or equivalently, conductivity, in the ground as a function of depth. Typical targets of interest include ore bodies, hydrocarbons, water, and environmental pollutants. Since the resistivities of such targets and the surrounding medium may be quite dissimilar, they may be discriminated by means of measurement of their subsurface resistivity when subjected to an electromagnetic field. Using this methodology, the depth, thickness, and lateral extent of materials of interest may be determined.

The source of the EM field used in a geophysical sounding may originate in the natural environment, or be manmade. If man-made, the source may produce a primarily a magnetic field or electrical field that varies in time. Such a primary field also produces a secondary field in the conducting earth. For example, an electrical field produces electrical currents in the earth that have an associated magnetic field, and a time-varying magnetic field induces electrical currents that result in an electrical field.

The electrical properties of the earth and rate of change of a field determine the relative magnitudes of the primary and secondary fields. The resultant primary and secondary fields represent a combined electromagnetic interaction with the earth even for a source arranged to produce solely an electrical or magnetic field.

While the majority of EM geophysical soundings are performed with sensors and EM sources on the surface of the earth, a borehole can provide physical access to the subsurface. Measurement of the electrical or magnetic field within a borehole can be related to the electrical or magnetic field in the earth around the borehole, or the fields that would exist in the earth in the absence of the borehole. Similarly, connecting an electrical field or magnetic field source to the earth via a borehole provides away to produce fields within the earth at desired depths without the attenuation and uncertainties that may result if the source fields originated from a source at the surface of the Earth.

The borehole may be an open hole in the host rock or may include a casing. If a casing is present it is usually made from a metal alloy, in which case it has a low value of electrical resistivity, or it may be made from an insulator, such as fiberglass. In some situations the casing may be segmented so that is partly a good electrical conductor in one or more regions and partly an insulator in one or more regions. Further the borehole may have tubing inserted into it, such as production tubing that affects the path of electric current.

A particularly beneficial configuration of borehole EM source is an electrode situated at the approximate depth of the formation or target of interest and a counter electrode situated at the surface adjacent to the well. Electric currents are caused to flow between the two electrodes with a suitable transmitter. These currents flow outwards radially from the well, probing a lateral region of order the depth of the downhole electrode. In another example, the counter electrode adjacent the well is replaced by a suite of six or more counter electrodes are arranged in an approximate ring or circular pattern centered on the borehole and of radius or order the borehole depth. In this case, significant electric currents in the ground are caused to flow from a source electrode at depth outwardly a radial distance from the borehole generally corresponding to the radius of the counter electrode ring. In yet another configuration a ring of counter electrodes is used, as described above and the electrically conducting casing of a borehole is used to inject the current at depth. In this case contact can be made at the top of the borehole.

The distribution of electric current flow produced by an EM source is determined by the three dimensional resistivity distribution within the earth. The electric current measured at the surface, or at depth with a borehole can be used to infer the 3-D resistivity variation over the region where significant current is flowing. The current is typically measured by a suitably calibrated array of electric or magnetic field sensors. The resulting 3-D resistivity variation can be used to project the distribution of ores, hydrocarbons or water within the volume of interest under investigation during the survey.

A common problem in applying the method of subsurface EM imaging has been to discriminate in the EM survey those data or measurements of interest, which are spatial changes in resistivity at the depth of the formation, from the effects of measurements occurring near the surface location of the sensor array. For an example array of electric field sensors deployed at the surface and a hydrocarbon reservoir at depth greater than 1 km, the challenge has been to reliably and accurately separate resistivity anomalies due to near surface inhomogeneities from spatial variations of interest for evaluating reservoir resistivity. This has been a particular challenge because the sensors are located very close to the earth surface and correspondingly far from the reservoir. The problem has been even more difficult in the case of time lapse monitoring, because the resistivity at the surface can be significantly affected by weather events such as rainfall and temperature variations occurring during the passage of time.

SUMMARY OF THE INVENTION

Briefly, the present invention provides a new and improved electromagnetic survey apparatus for measuring electrical properties of subsurface earth features. The electromagnetic survey apparatus includes a transmitter providing electric power for an electric current within the subsurface forming an electromagnetic field. The electromagnetic survey apparatus also includes an electrode positioned at a well borehole to cause an electric current to flow in a formation at a depth of interest; a wellhead electrode at the at the earth surface adjacent the borehole; and a counter electrode or suite of electrodes at the earth surface and spaced from the borehole. The electromagnetic survey apparatus also includes a switching mechanism selectively electrically connecting the transmitter to selected pairs of the electrodes for electrical current to flow between the connected electrodes and form an electromagnetic field, and an array of electromagnetic sensors at the earth surface disposed to sense the electromagnetic field between the connected electrodes.

The present invention also provides a new and improved method of electromagnetic surveying for measuring electrical properties of subsurface earth features. An electrode is positioned at a well borehole to cause an electric current to flow in a formation at a depth of interest. A wellhead electrode is placed at the at the earth surface adjacent the borehole, and a counter electrode or suite of electrodes is placed at the earth surface and spaced from the borehole. An array of electromagnetic sensors is placed at the earth surface. A transmitter of electrical current is selectively electrically connected to selected pairs of the current electrodes for electrical current to flow between the connected electrodes and form an electromagnetic field. The electromagnetic field between the connected electrodes is sensed with the electromagnetic sensors, and the sensed electromagnetic field data is then processed for analysis and evaluation.

DETAILED DESCRIPTION OF THE PREFERRED EMBODIMENTS

In the drawings, an apparatus A according to the present invention for generating electromagnetic fields by current flow within the earth and sensing the response of the earth to such fields to measure electrical properties, such as resistivity or conductivity, in what is known as a borehole to surface electromagnetic (or BSEM) survey. The measurements obtained of such electrical properties during the BSEM survey permit evaluation features such as depth, thickness and lateral extent of subsurface features of interest. As will be set forth, the apparatus A provides a methodology to obtain measurements to discriminate for and reduce the effects of subsurface anomalies near the earth surface.

Figure 1:
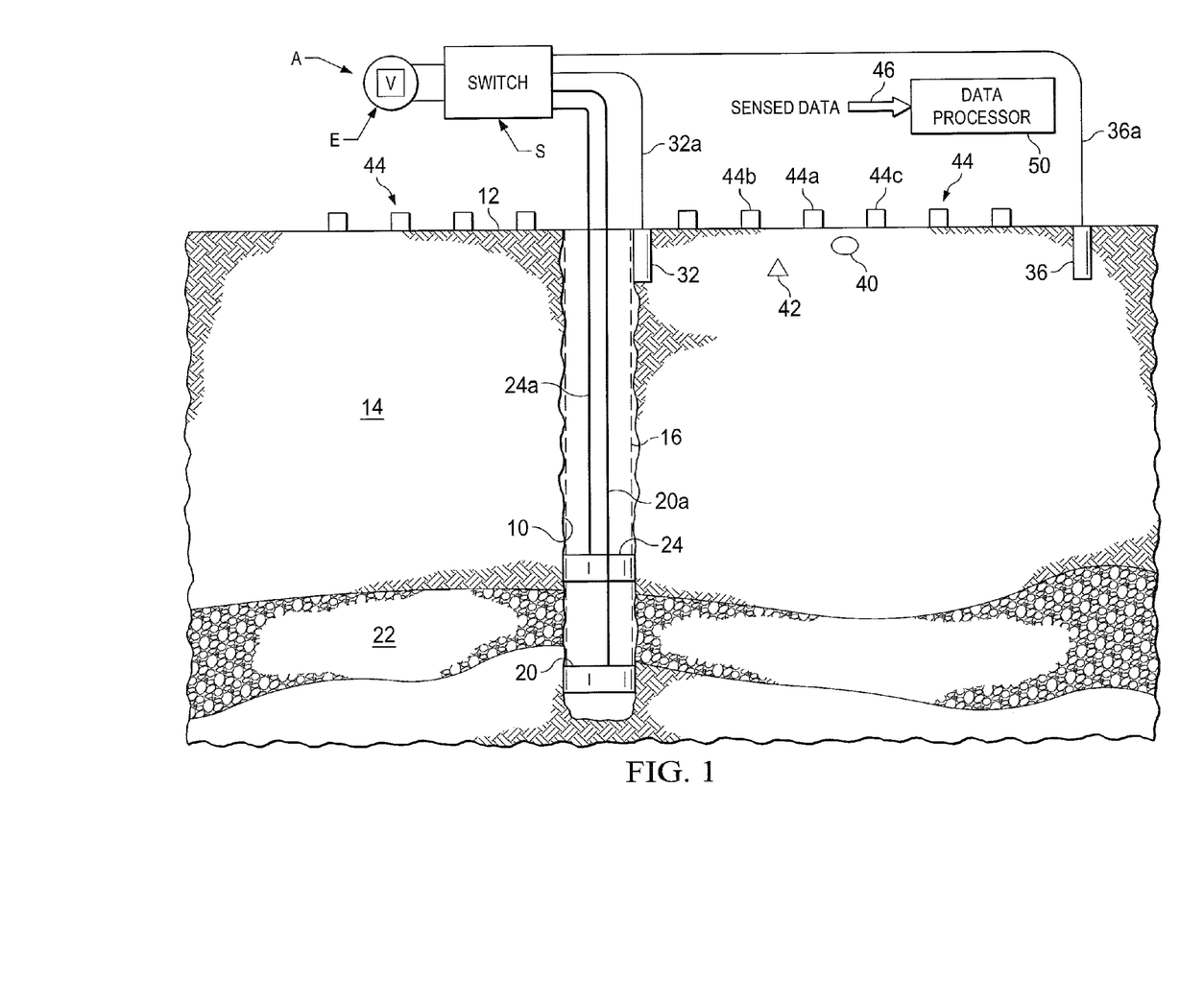
FIG. 1 is a schematic diagram of a borehole to surface electromagnetic (BSEM) survey according to the present invention.

As shown in FIG. 1, a borehole 10 is formed extending downwardly from the earth surface 12 into subsurface formations indicated generally indicated at 14. The borehole 10 is formed in the earth in material that includes rock, sand, sandstone, carbonates, soil, salts, volcanic or other material, in particular material that is typically capable of containing hydrocarbons.

The borehole 10 may be an open hole in the host rock or may include a casing as shown schematically in phantom at 16 (FIG. 1). If casing 16 is present it is usually made from a metal alloy, in which case it has a low value of electrical resistivity, or it may be made from an insulator, such as fiberglass. In some situations casing 16 may be segmented so that is partly a good electrical conductor in one or more regions and partly an insulator in one or more regions. Further the borehole 10 may have tubing inserted into it, such as production tubing that affects the path of electric current.

An electromagnetic energy source or transmitter E of the apparatus A of conventional powerful transmitter type generates electrical current of a desired amplitude, frequency and waveform. The electromagnetic source E is connectable through a switch mechanism S to several types of electrodes in the apparatus A for causing the injection and flow of electrical current during electromagnetic surveying according to the present invention.

The several types of electrodes in the apparatus A are characterized by their relative positions with respect to each other and with respect to the well borehole 10. The electrodes are grouped into sets according to their general physical location. Selected ones of the electrodes are connected by the switch S to the electromagnetic source E so that electric current from the source E flows between them, The switch S may be for example of the type known as a 3-position transfer switch such as the Reliance model 51410CK10-14 available from Electric Generators Direct Inc. Alternatively, the switching may be manually accomplished by connecting power supply conductors or cables associated with selected sets of groups of the electrodes to outlet connectors of the source E.

A first type of electrode is a borehole electrode, as indicated at 20 in the borehole 10 at or near a formation 22 of interest. As indicated, an additional borehole electrode 24 and optionally one or more others may also inserted be positioned in the borehole 10, as will be set forth. The borehole electrodes 20 and 24 are electrically connectable through the switch S to the electromagnetic source E to inject electrical current into the earth in the borehole 10. Power supply conductors or cables 20a and 24a extend from the switch S downwardly into the borehole 10 to provide electrical current for injection into the earth during electromagnetic surveying.

For convenience the transmitter or source E can be located at the surface, though this is not essential. The borehole electrodes 20 and 24, cables 20a and 24a, as well transmitter E and switch S may be inserted into the borehole 10 in any of several conventional manners, including wireline, work string or coiled tubing. In the case of a borehole 10 that is under pressure, the assembly may be inserted in the wellbore using a lubricator in order to maintain the well's pressure.

The borehole electrodes such as 20 and 24 can be formed with an outer surface intended to compliment or contact an interior surface of the wall of borehole 10 to facilitate contact. The borehole 10 may be uncased as shown, or it may be of the type having casing installed along its entire length, or it may be uncased only in the vicinity of the borehole electrodes 20 and 24.

Figure 2:
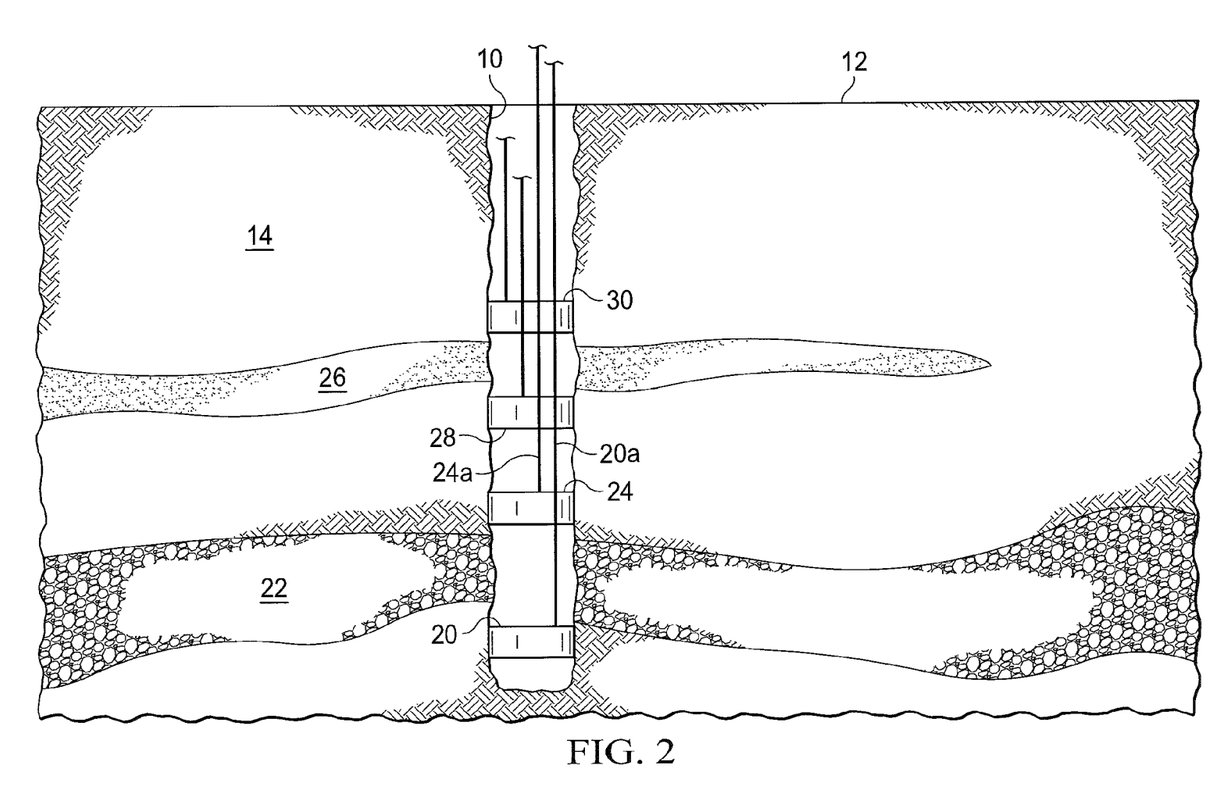
FIG. 2 is a schematic diagram of placement of borehole sources in a borehole for the survey shown in FIG. 1 for illuminating two subsurface earth formations with electromagnetic energy according to the present invention.

Borehole electrodes 20 and 24 are located approximately the same distance above and below formation 22. If additional formations of interest are present within the earth, additional electrodes can be added to span them in a corresponding manner. For example, FIG. 2 shows a borehole source configuration according to the present invention that intersects two formations 22 and 26. Each of formations 22 and 26 is addressed by a separate pair of electrodes, electrodes 20 and 24 for formation 22 and electrodes 28 and 30 for formation 26. In some cases adjacent electrodes, such as 24 and 28 in FIG. 2, may be combined into a single electrode.

A second type of electrode is a wellhead electrode, as indicated at 32 (FIG. 1) located on or in the earth surface 12 at a wellhead 34 from which the borehole 10 is drilled into the earth. The wellhead electrode 32 is electrically connectable by a power supply conductor or cable 32a through the switch S to the electromagnetic source E to inject electrical current into the earth or receive electrical current at the wellhead 34.

A third type of electrode is a spaced field counter electrode 36 located at or near the earth surface spaced some distance from the borehole 10 and well head 34 based on the depth of formations being investigated. A power supply conductor or cable 36a extends from the switch S to the field counter electrode 36 to provide for electrical current injection into the earth or to receive such current during electromagnetic surveying. Electrode 36 can be implemented as a continuous ring or a group of individual electrodes arranged in a ring extending over the surface area above regions of the subsurface in which the BSEM survey is being conducted, if desired, as described in U.S. patent application Ser. No. 14/013,579, filed of even date herewith. The spaced counter electrode 36 can thus be implemented as a continuous ring or a group of individual electrodes of like construction arranged in a ring.

As also shown in FIG. 1, electrical resistivity anomalies 40 and 42 are shown schematically near the earth surface 12. Either or both of the anomalies 40 and 42 may be in the form of a reduction in the local electric resistivity caused, for example, by a metallic object, such as a pipe, buried in the ground, or a collection of water. Alternatively, either or both of the anomalies may be in the form of an increase in the local resistivity such as that caused by a mass of less conductive earth such as hydrocarbon accumulation, large rock or sand, or a region of lower compaction. Generally, such anomalies are of small physical size compared to the formations of interest, and to the scale of the survey.

Electromagnetic sensors indicated generally at 44 are disposed either just above or just below the earth surface 12 following standard installation methods. The sensors 44 are outside the borehole, and are separated from the borehole by a distance which in practical cases is at least 100 m. The sensors 44 sense the electromagnetic field components caused by the flow of current, injected by the apparatus A. The sensors 44 are, for example, of the type described in "First Borehole to Surface Electromagnetic Survey in KSA: reservoir mapping & monitoring at a new scale", SPE 146348, of which Applicant Marsala is a co-author. The sensors 44 are arranged in a two-dimensional array of size and extent described in that article. As a result, the extent of earth covered by the array of sensors 44, data are obtained for analysis and evaluation of subsurface formations. As indicated at 46, the data sensed by the sensors 44 is provided as input data to a data processor or computer 50 for processing and subsequent analysis and evaluation.

One or more of sensors in group 44, for example a sensor 44a and to somewhat lesser extent sensors 44b and 44c are shown at deployed positions located closely enough to one or more of the subsurface anomalies 40 and 42. As a result, their output signals in response to the injected subsurface current is significantly distorted by the effect of the anomaly or anomalies which are present. In actual practice, the presence and size of anomalies not known while the BSEM survey is being planned or when the survey data are collected.

The present invention addresses a problem caused by the of such near surface anomalies. When the magnitude and location of subsurface anomalies is not known, their effect cannot be accounted for in the analysis of the data collected from sensors 44. Thus, if anomaly 40 produces a change in the output of sensor 44a this change cannot be distinguished from a change due to a feature of interest in formation 22.

With the present invention, errors or distortive effects produced in data during a BSEM survey by such near surface electrical anomalies on the estimates of formation properties are discriminated and reduced. The effects of variations in subsurface electrical resistivity near the surface are separated from electrical resistivity changes at locations in the formations of interest far from the measurement region. The electromagnetic fields in the survey data are processed in computer 50 after being sensed, so that the effects of near surface anomalies are detectable in the data and removable from the survey data of interest regarding the formations of interest. The survey data after such processing more accurately indicates formation features or properties of interest.

Figure 3:
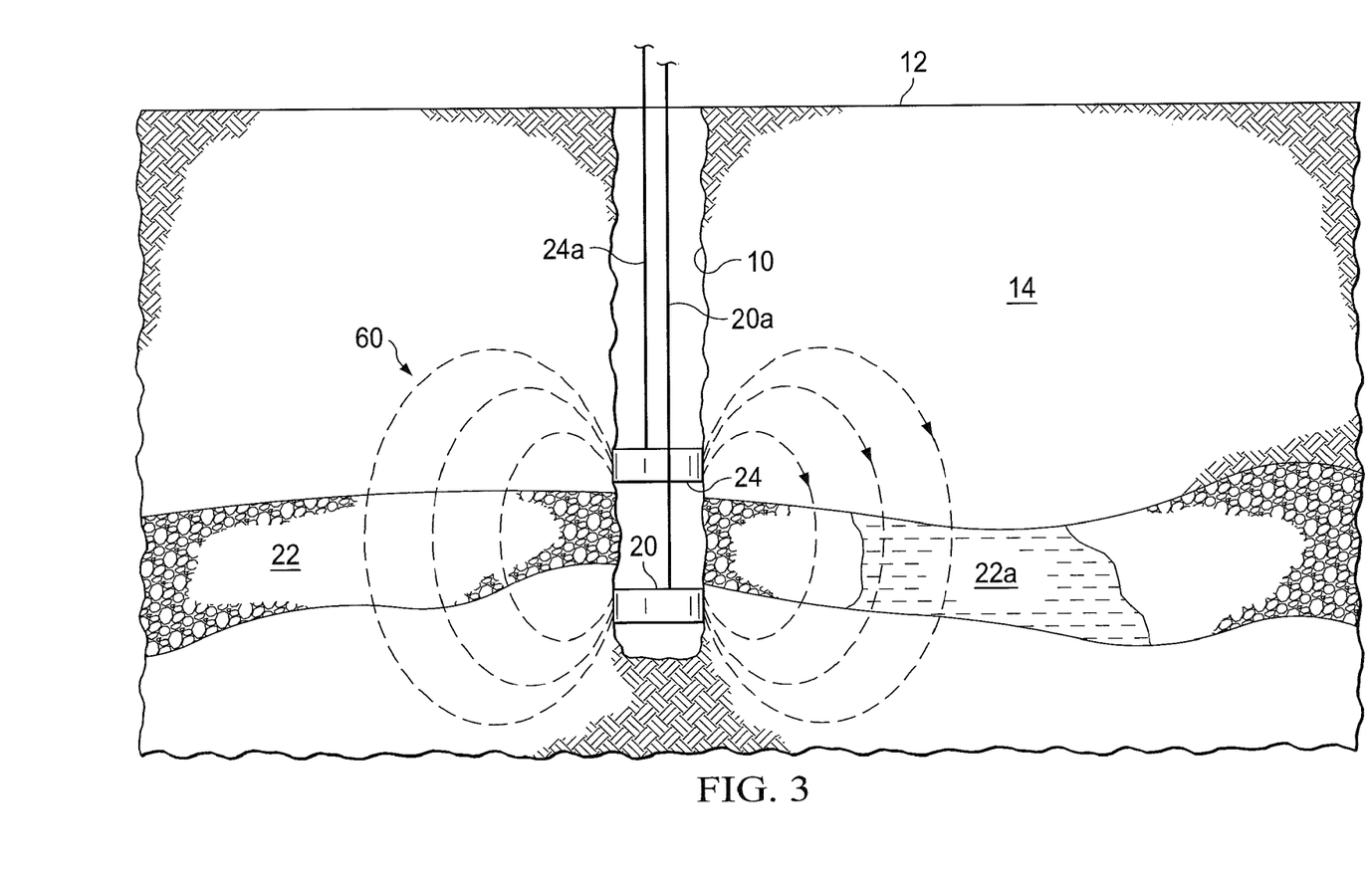
FIG. 3 is a schematic diagram illustrating electric current paths resulting from the sources of FIG. 2 being driven in an anti-phase relation to each other.

In FIG. 3, an example of the structure of formation 22 is shown with a region 22a having a different resistivity from the remainder of formation 22. Portions of the apparatus A shown in FIG. 1 are not indicated in FIG. 3, so that features of interest may be more clearly seen. Region 22a could correspond to a body of water injected into formation 22 in order to displace hydrocarbons towards borehole 10. FIG. 3 also shows three example paths indicated at 60 of electric current in subsurface 14 when the current injected by electrodes 20 and 24 is driven in anti-phase or phase opposition to each other, 180° out of phase. This can be accomplished by connecting the electrodes 20 and 24 through the switch S in an opposite manner or polarity from each other. Thus, at any given time electrode 20 has equal and opposite electric potential to electrode 24. In this arrangement the electric currents cross formation 22 in a direction primarily orthogonal to the plane of formation 22. The paths 60 of the electric current therefore flow primarily in the subsurface rock.

Figure 4:
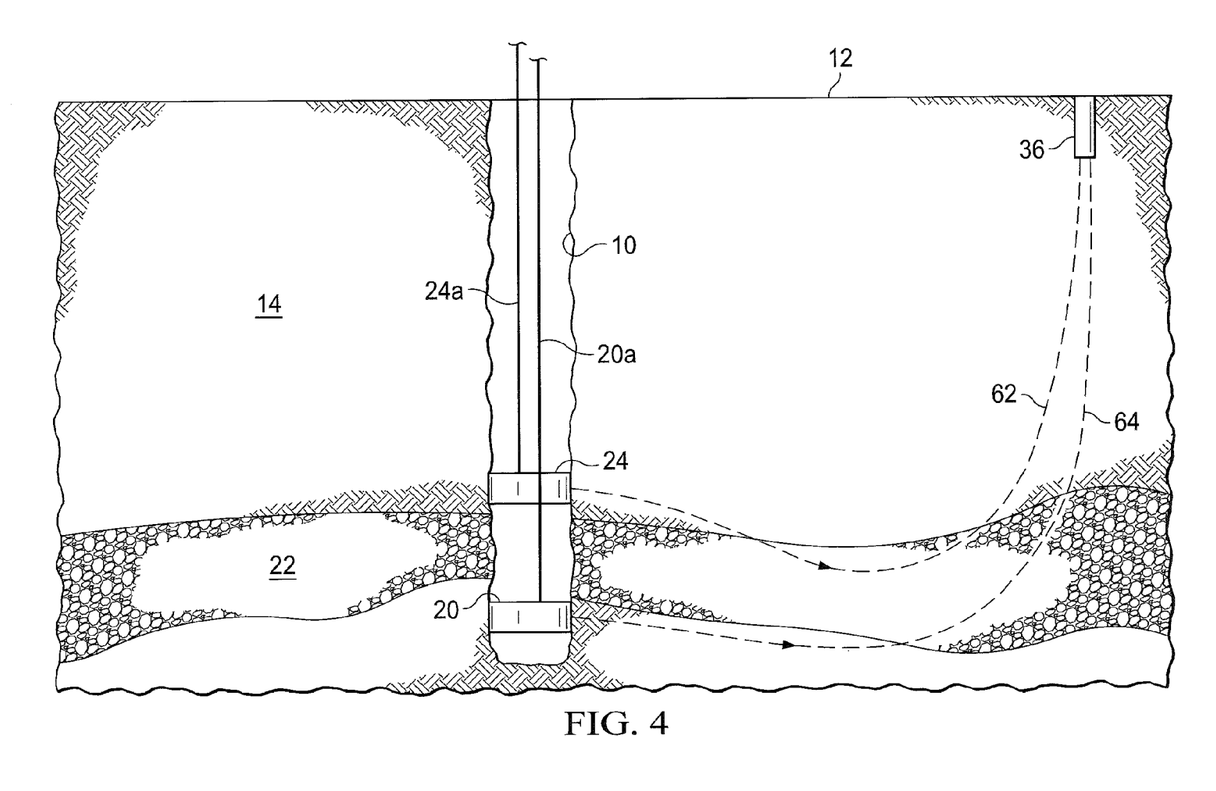
FIG. 4 is a schematic diagram illustrating electric current paths to a surface counter electrode resulting from the sources of FIG. 2 being driven in phase relative each other.

FIG. 4 shows paths of the currents within subsurface 14 and formation 22 when electrodes 20 and 24 are driven in phase and offset or spaced counter electrode 36 is used as the counter electrode. For example, one output terminal of the source transmitter E is connected in common to electrodes 20 and 24, respectively, while the other output of the source E is connected to electrode 36 by the switch S. Again, portions of the apparatus shown in FIG. 1 are not indicated in FIG. 4, so that features of interest may be more clearly seen. The current flow between the electrodes shown in FIG. 4 is through a cross section of subsurface formations 22 as indicated schematically by lines 62 and 64. In this arrangement the current path is primarily in the plane of formation 22. Due to natural geologic processes in many situations, the resistivity of formation 22 is often less than the subsurface region in its immediate vicinity. The lower resistivity of the formation further causes the injected current to flow within the formation 22.

Figure 5:
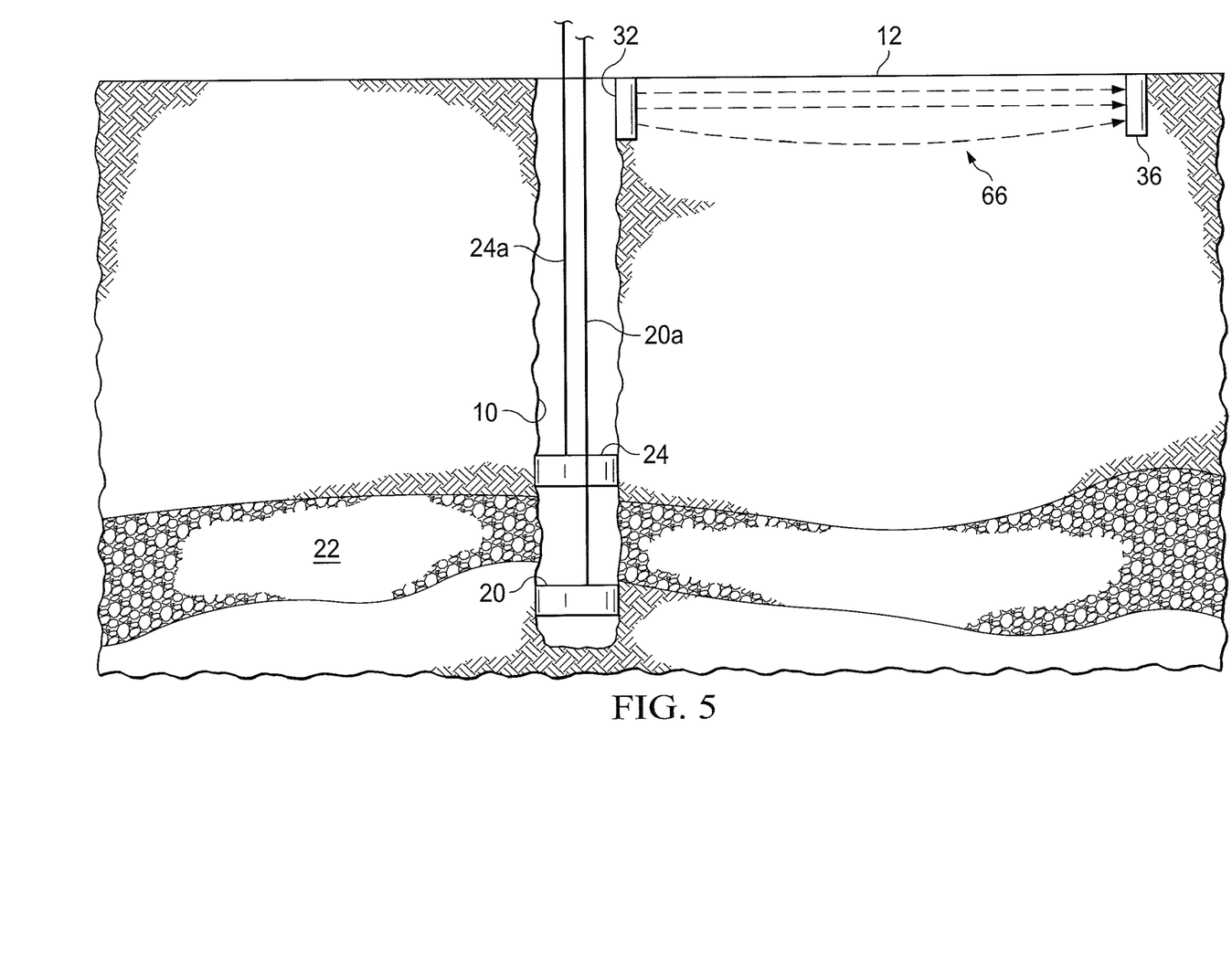
FIG. 5 is a schematic diagram illustrating electric current paths at or near the earth's surface from a source electrode to a surface counter electrode in the survey of FIG. 1.

FIG. 5 shows the path of the currents within subsurface 14 when the transmitter source E is connected across electrodes 32 and 36. The resulting current flow is indicated by lines 66. As in FIGS. 3 and 4, portions of the apparatus shown in FIG. 1 are not indicated in FIG. 5, so that features of interest may be more clearly seen. In the arrangement of FIG. 5, the current flow is predominantly parallel to, and in the vicinity of, earth surface 12.

Figure 6:
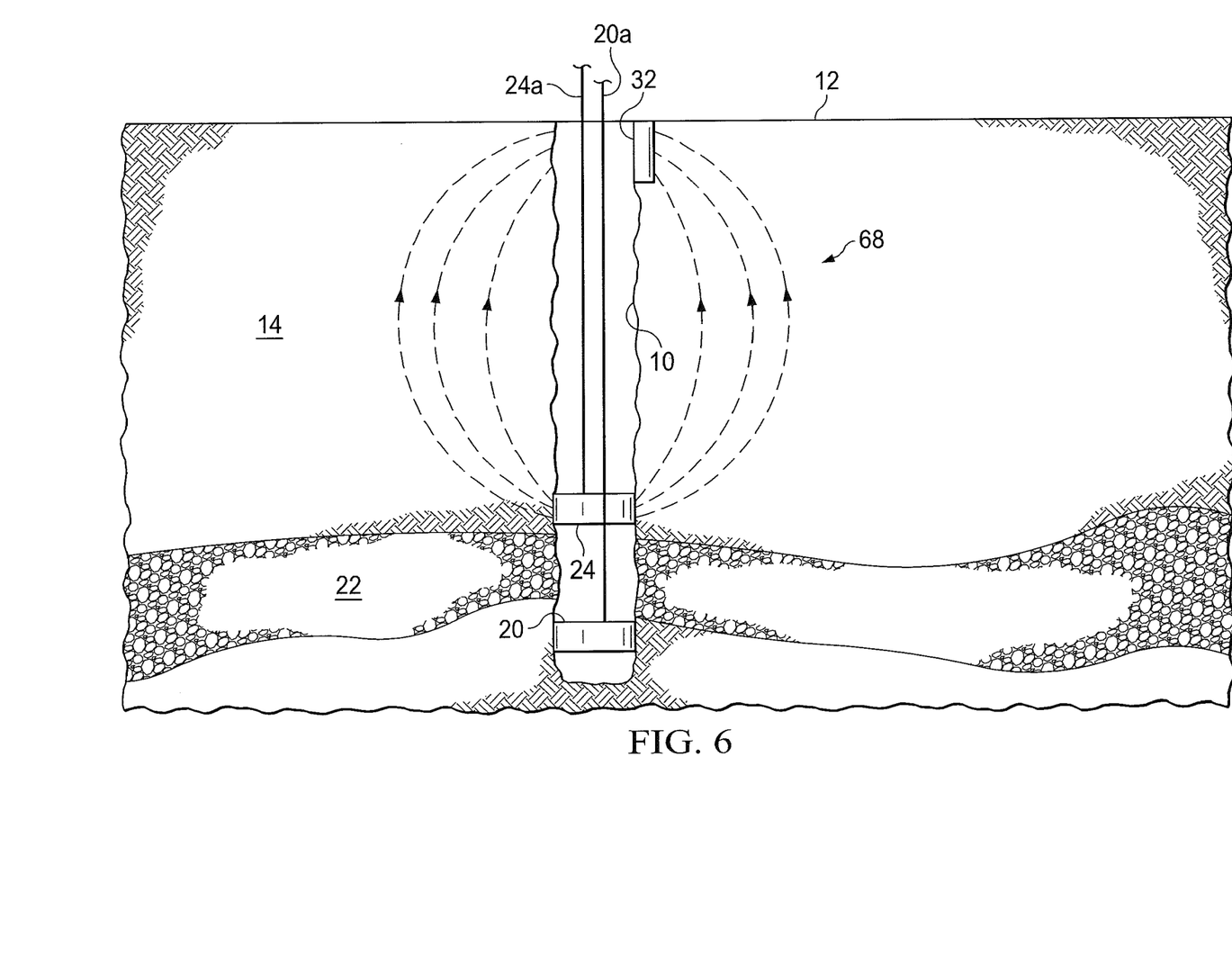
FIG. 6 is a schematic diagram illustrating electric current paths from a source electrode in a borehole to a surface counter electrode.

FIG. 6 shows the path of the currents within subsurface 14 when the transmitter source E is connected across electrodes 24 and 32. Portions of the apparatus shown in FIG. 1 are also not indicated in FIG. 6, for reasons previously stated. The resulting current flow in the connections shown in FIG. 6 is indicated by the lines 68. A very similar current path would be present when the transmitter is connected across electrodes 20 and 32, or across any downhole electrode at formation depth and a wellhead electrode 32. In this arrangement the current flow is predominantly parallel to the axis of borehole 10, and a relatively small current flows in the vicinity of earth surface 12. It is to be noted that in the configuration illustrated FIG. 6, the two downhole electrodes 20 and 24 can be implemented by moving a single electrode to each of the desired downhole electrode depths. Indeed, the depth of current injection by the downhole electrode 20 can be any number of depths by moving the downhole electrode to different depths for each current injection.

Figure 7:
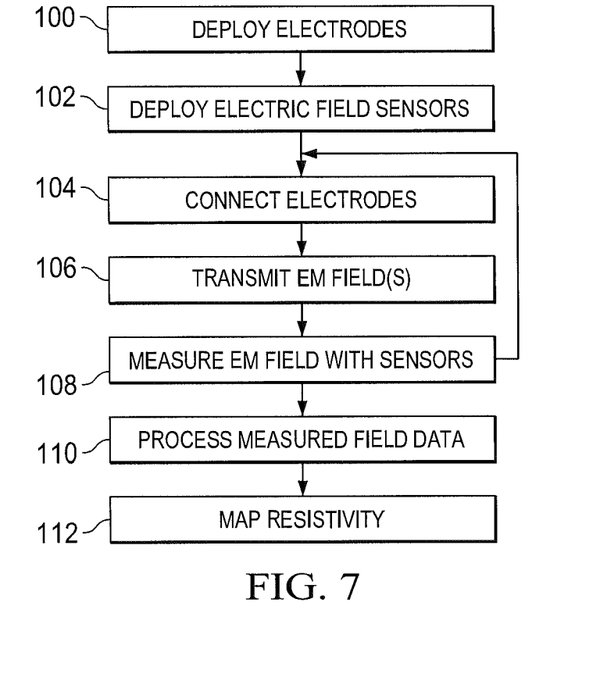
FIG. 7 is a functional block diagram of a set of process for borehole to surface electromagnetic surveying with improved discrimination of subsurface features according to the present invention.

FIG. 7 illustrates the methodology or process of BSEM surveying according to the present invention. As shown at step 100, borehole electrodes such as 20 and 24, wellhead electrodes 32 and spaced counter electrodes 36 are deployed at their respective positions as shown in FIG. 1 as described above. As indicated during step 102 the array of electric field sensors 44 are deployed at or near the earth surface, as also described above.

During step 104, selected groups of the deployed electrodes are connected in desired settings to the source E of the types shown in FIGS. 3, 5 and 6. In step 106, an electromagnetic current and resultant electromagnetic field is transmitted between the connected electrodes resulting from step 104. As indicated at step 108, the transmitted electromagnetic fields resulting from current flow between connected electrodes during each performance of step 106 are measured with the deployed electromagnetic field sensors 44 and are available for processing by the processor during step 110.

As indicated in FIG. 7, the connections between electrodes can be modified by repeating step 104 after transmitting electric current during step 106 and measuring the sensed electromagnetic fields during step 108. The current is transmitted between the modified groups of electrodes which are connected by repeating step 106, as required by the survey plan or schedule, and the electromagnetic fields measured by repeating step 108.

The methodology of processing during step 110 according to the present invention is illustrated by consideration of FIGS. 3 and 5. By application of current form the transmitter E across electrodes 20 and 24 both of which are at formation depth, as shown in FIG. 3, the formation is preferentially illuminated with electromagnetic energy and probed by the subsurface current between such electrodes.

By application of current from the transmitter E across electrodes 32 and 36 both of which are at the surface, as in FIG. 5, the resistivity anomalies near to the electrodes are preferentially illuminated with electromagnetic energy and probed by the subsurface current between those electrodes. Thus, the value of the sensor voltages measured when the current is injected by electrodes such as is shown in FIG. 5 provides an independent measure of the presence of resistivity anomalies in the vicinity of one or more surface receiver sensors of the group 44.

Specifically, the individual field amplitudes and phases recorded by each of the sensors 44 can be calculated assuming the subsurface 14 is of adequately uniform, or substantially uniform, bulk resistivity. The value of this resistivity as a function of depth can, for example, be determined by standard well logging methods. Then any deviation from the predicted field for any sensor can be attributed to the presence of a resistivity anomaly sufficiently close to the sensor to cause a deviation in the measured field. Furthermore, given that the subsurface electrical current at any given location in the earth can be calculated, the value of the resistivity associated with the anomaly can be estimated.

The BSEM survey to map the resistivity distribution of one or more subsurface formations can be performed by one or more of the downhole and surface electrode arrangements illustrated in FIGS. 3, 4, and 6. In each case a forward model is used to calculate the fields at the surface sensors 44 assuming a model for the resistivity of the one or more formations and the subsurface. In each case, this model can be improved by utilizing an estimate of the effect of resistivity anomalies in the vicinity of the sensors.

During step 112, the resistivity distribution of the subsurface from the obtained measures of resistivity at the sensors 44 is then mapped or displayed on a suitable computer display.

The present invention thus separates the effects of variations in subsurface electrical resistivity near the surface from electrical resistivity changes caused by changes in subsurface structure of interest for analysis and evaluation. The present improves the accuracy of a BSEM survey by providing an independent estimate of the effect of subsurface resistivity anomalies on an array of surface sensors. With the present invention, more than one component of the BSEM field at the surface can be acquired, and both electric field and magnetic fields can be measured. Accordingly, the present invention may be combined with multiple sensor orientations and different electromagnetic fields.

In addition, although the illustrated embodiment described above has shown the electromagnetic sensors at the surface, the method of selectively causing electric current to flow in different paths to separate resistivity anomalies in different regions according to the present invention can also be used with electromagnetic sensors that are deployed downhole. In this further embodiment, current flowing between one or more downhole electrodes (e.g. 20, 24) and a surface electrode 32 provides the signal that probes resistivity anomalies near to the sensors, while electrodes at the surface provide the field that penetrates the subsurface structure of interest. In yet a further embodiment, an array of source electrodes can be deployed at the surface, for example at the positions 44, 44a, and 44b, to provide the currents that probe the subsurface structure of interest.

Thus, the present invention provides for separating, or predominantly separating, the signal produced by a near surface anomaly from a signal produced at formation depths for borehole based electromagnetic measurements. The present invention also does not materially attenuate or otherwise reduce the spatial range of a BSEM survey.

The present invention causes the injected currents to flow preferentially in geologic formations in defined paths, and separately in regions where anomalies have significant effect on the signals to be measured, in order to better differentiate the response of the geologic regions of interest to the applied currents.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. An electromagnetic survey apparatus for measuring electrical resistivity properties of subsurface formations of interest, comprising:
    a transmitter providing electric power for an electric current within the subsurface forming an electromagnetic field;
    a borehole electrode positioned within a borehole at a depth of interest to inject electric current into the subsurface at the depth of interest;
    a wellhead electrode at the earth surface adjacent the borehole to inject and receive electric current at the earth surface;
    a counter electrode at the earth surface and at a spaced position at the earth surface from the borehole to receive electric current at the earth surface;
    a switching mechanism selectively electrically connecting the transmitter to the borehole electrode and the wellhead electrode for electrical current to flow through subsurface features between the borehole electrode and the wellhead electrode and form an electromagnetic field regarding the subsurface features of interest of the earth between the borehole depth of interest and the wellhead;
    the switching mechanism selectively electrically connecting the transmitter to the wellhead electrode and the counter electrode for electrical current to flow through the subsurface earth between the wellhead electrode and the counter electrode and form an electromagnetic field regarding near surface electrical resistivity anomalies of the earth between the wellhead and the spaced position at the earth surface from the borehole;
    an array of electromagnetic sensors at the earth surface disposed to sense the electromagnetic field between the electrodes electrically connected to the transmitter as input electromagnetic field data for processing;
    a data processor forming a measure of resistivity of the subsurface formation of interest from the sensed electromagnetic field data regarding the subsurface features of interest between the borehole depth of interest and the wellhead;
    the data processor further forming a measure of resistivity of near surface electrical resistivity anomalies from the sensed electromagnetic field data regarding near surface electrical resistivity anomalies between the wellhead and the spaced position at the earth surface from the borehole; and
    the data processor further removing effects of near surface electrical resistivity anomalies between the wellhead and the spaced position at the earth surface from the measure of resistivity of the subsurface formations of interest for assessing electrical properties of the subsurface formations of interest.

2. The electromagnetic survey apparatus of claim 1, wherein the borehole has a metallic casing that extends substantially over its entire length.

3. The electromagnetic survey apparatus of claim 1, wherein the borehole has a metallic casing that extends partly over its length.

4. The electromagnetic survey apparatus of claim 1, wherein the counter electrode is one of a plurality of electrodes arranged on the earth surface in a ring concentric on the borehole.

5. The electromagnetic survey apparatus of claim 4, wherein each of the plurality of electrodes arranged in the ring are electrically connected together to receive electrical current as a common counter electrode.

6. A method of electromagnetic surveying for measuring electrical resistivity properties of subsurface earth formations of interest, comprising the steps of:
    placing a borehole electrode positioned within a borehole at a depth of interest to inject electric current into the subsurface at the depth of interest;
    placing a wellhead electrode at the earth surface adjacent the borehole to inject and receive electric current at the earth surface;
    placing a counter electrode at the earth surface and at a spaced position at the earth surface from the borehole to receive electric current at the earth surface;
    placing an array of electromagnetic sensors at the surface to sense an electromagnetic field between the electrodes as input electromagnetic field data for processing;
    electrically connecting a transmitter of electrical current to the borehole electrode and wellhead electrode for electrical current to flow through subsurface features between the connected borehole and wellhead electrodes and form an electromagnetic field regarding subsurface features of interest of the earth between the borehole depth of interest and the wellhead;
    obtaining data from the electromagnetic sensors about the electromagnetic field regarding subsurface features of interest between the connected borehole and wellhead electrodes;
    modifying electrical connections of the transmitter by electrically connecting the transmitter to the wellhead electrode and the counter electrode for electrical current to flow through the subsurface earth between the connected wellhead and counter electrodes and form an electromagnetic field regarding near surface electrical resistivity anomalies of the earth between the wellhead and the spaced position at the earth surface from the borehole;
    obtaining data from the electromagnetic sensors about the electromagnetic field regarding near surface electrical resistivity anomalies between the connected wellhead and counter electrodes;
    processing the sensed electromagnetic field data by performing the steps of:
        (1) forming a measure of resistivity of the subsurface features of interest from the obtained electromagnetic field data regarding subsurface features of interest between the borehole and the wellhead; and
        (2) forming a measure of resistivity of near surface electrical resistivity anomalies from the obtained electromagnetic field data regarding near surface electrical resistivity anomalies between the wellhead and the spaced position at the earth surface from the borehole; and
        (3) removing effects of near surface electrical resistivity anomalies between the wellhead and the spaced position at the earth surface from the measure of resistivity of the subsurface formations of interest.

7. The method of claim 6, further including the step of:
placing a plurality of electrodes arranged on the earth surface in a ring concentric on the borehole.

8. The method of claim 7, further including the step of:
electrically connecting the plurality of electrodes to the counter electrode to receive electrical current as a common electrode.

9. An electromagnetic survey apparatus for measuring electrical resistivity properties of subsurface earth formations of interest, comprising:
a transmitter providing electric power for an electric current within the subsurface forming an electromagnetic field;
a borehole electrode positioned within a borehole at a depth of interest to inject electric current into the subsurface at the depth of interest;
a wellhead electrode at the earth surface adjacent the borehole to inject and receive electric current at the earth surface;
a counter electrode at the earth surface and at a spaced position at the earth surface from the borehole to receive electric current at the earth surface;
a switching mechanism selectively electrically connecting the transmitter to the borehole electrode and the counter electrode for electrical current to flow through subsurface features between the borehole electrode and the counter electrode and form an electromagnetic field regarding subsurface features of interest of the earth between the borehole depth of interest and the spaced position at the earth surface from the borehole;
the switching mechanism selectively electrically connecting the transmitter to the wellhead electrode and the counter electrode for electrical current to flow the subsurface earth between the wellhead electrode and the counter electrode and form an electromagnetic field regarding near surface electrical resistivity anomalies of the earth between the wellhead and the spaced position at the earth surface from the borehole;
an array of electromagnetic sensors at the earth surface disposed to sense the electromagnetic field between the electrodes electrically connected to the transmitter as input electromagnetic field data for processing;
a data processor forming a measure of resistivity of the subsurface formation of interest from the sensed electromagnetic field data regarding the subsurface formation of interest between the borehole depth of interest and the spaced position at the earth surface from the borehole;
the data processor further forming a measure of electrical resistivity of near surface electrical resistivity anomalies from the sensed electromagnetic field data regarding near surface electrical resistivity anomalies between the wellhead and the spaced position at the earth surface from the borehole; and
the data processor further removing effects of near surface electrical resistivity anomalies between the wellhead and the spaced position at the earth surface from the borehole from the electromagnetic field data for assessing electrical properties of the subsurface formations of interest.

10. A method of electromagnetic surveying for measuring electrical properties of subsurface earth features, comprising the steps of:
placing a borehole electrode positioned within a borehole at a depth of interest to inject electric current into the subsurface at the depth of interest;
placing a wellhead electrode at the earth surface adjacent the borehole to inject and receive electric current at the earth surface;
placing a counter electrode at the earth surface and at a spaced position at the earth surface from the borehole to receive electric current at the earth surface;
placing an array of electromagnetic sensors at the surface to sense an electromagnetic field between the electrodes as input electromagnetic field data for processing;
electrically connecting a transmitter of electrical current to the borehole electrode and counter electrode for electrical current to flow through subsurface features between the connected borehole and counter electrodes and form an electromagnetic field regarding subsurface features of interest of the earth between the borehole depth of interest and the wellhead;
obtaining data from the electromagnetic sensors about the electromagnetic field regarding subsurface features of interest between the connected borehole and counter electrodes;
modifying electrical connections of the transmitter by electrically connecting the transmitter to the wellhead electrode and the counter electrode for electrical current to flow through the subsurface earth between the connected wellhead and counter electrodes and form an electromagnetic field regarding near surface electrical resistivity anomalies of the earth between the wellhead and the spaced position at the earth surface from the borehole;
obtaining data from the electromagnetic sensors about the electromagnetic field regarding near surface electrical resistivity anomalies between the connected wellhead and counter electrodes; and
processing the sensed electromagnetic field data by performing the steps of:
(1) forming a measure of resistivity of the subsurface formation of interest from the obtained electromagnetic field data regarding subsurface formations of interest between the borehole and the spaced position at the earth surface from the borehole; and
(2) forming a measure of resistivity of near surface electrical resistivity anomalies from the obtained electromagnetic field data regarding near surface electrical resistivity anomalies between the wellhead and the spaced position at the earth surface from the borehole; and
(3) removing effects of near surface electrical resistivity anomalies between the wellhead and the spaced position at the earth surface from the measure of resistivity of the subsurface formations of interest.

11. An electromagnetic survey apparatus for measuring electrical properties of subsurface earth formations of interest, comprising:
a transmitter providing electric power for an electric current within the subsurface forming an electromagnetic field;
a borehole electrode positioned within a borehole at a depth of interest to inject electric current into the subsurface at the depth of interest;
a wellhead electrode at the earth surface adjacent the borehole to inject and receive electric current at the earth surface;
a counter electrode at the earth surface and at a spaced position at the earth surface from the borehole to receive electric current at the earth surface;

a switching mechanism selectively electrically connecting the transmitter to the borehole electrode and the counter electrode for electrical current to flow through subsurface features between the borehole electrode and the counter electrode and form an electromagnetic field regarding the subsurface features of interest of the earth between the borehole depth of interest and the spaced position at the earth surface from the borehole;

the switching mechanism selectively electrically connecting the transmitter to the wellhead electrode and the counter electrode for electrical current to flow through the subsurface earth between the wellhead electrode and the counter electrode and form an electromagnetic field regarding near surface electrical resistivity anomalies of the earth between the wellhead and the spaced position at the earth surface from the borehole;

an array of electromagnetic sensors deployed in the borehole disposed to sense the electromagnetic field between the electrodes electrically connected to the transmitter as input electromagnetic field data for processing;

a data processor forming a measure of resistivity of the subsurface formation of interest from the sensed electromagnetic field data regarding the subsurface features of interest between the borehole depth of interest and the spaced position at the earth surface from the borehole; and the data processor further forming a measure of resistivity of near surface electrical resistivity anomalies from the sensed electromagnetic field data regarding near surface electrical resistivity anomalies between the wellhead and the spaced position at the earth surface from the borehole; and the data processor further removing effects of near surface electrical resistivity anomalies between the wellhead and the spaced position at the earth surface from the measure of resistivity for assessing electrical properties of the subsurface formations of interest.

12. An electromagnetic survey apparatus for measuring electrical resistivity properties of subsurface earth formations of interest, comprising:

a transmitter providing electric power for an electric current within the subsurface forming an electromagnetic field;

a plurality of borehole electrodes positioned within a borehole at different depths of interest above one of the subsurface formations of interest to inject electric current into the subsurface;

a wellhead electrode at the earth surface adjacent the borehole to inject and receive electric current at the earth surface;

a counter electrode at the earth surface and at a spaced position at the earth surface from the borehole to receive electric current at the earth surface;

a switching mechanism selectively electrically connecting the transmitter to the borehole electrode and the wellhead electrode for electrical current to flow through subsurface features between the borehole electrode and the wellhead electrode and form an electromagnetic field regarding the subsurface features of interest of the earth between the borehole depth of interest and the wellhead;

the switching mechanism selectively electrically connecting the transmitter to the wellhead electrode and the counter electrode for electrical current to flow through the subsurface earth between the wellhead electrode and the counter electrode and form an electromagnetic field regarding near surface electrical resistivity anomalies of the earth between the wellhead and the spaced position at the earth surface from the borehole;

an array of electromagnetic sensors at the earth surface disposed to sense the electromagnetic field between the electrodes electrically connected to the transmitter as input electromagnetic field data for processing;

a data processor forming a measure of resistivity of the subsurface formation of interest from the sensed electromagnetic field data regarding the subsurface features of interest between the borehole depth of interest and the wellhead;

the data processor further forming a measure of resistivity of near surface electrical resistivity anomalies from the sensed electromagnetic field data regarding near surface electrical resistivity anomalies between the wellhead and the spaced position at the earth surface from the borehole; and the data processor further removing effects of near surface electrical resistivity anomalies between the wellhead and the spaced position at the earth surface from the measure of resistivity for assessing electrical properties of the subsurface formations of interest.

13. The electromagnetic survey apparatus of claim 12, wherein one of the plurality of borehole electrodes is electrically connected to cause the flow of electrical current in an anti-phase relation to another of the borehole electrodes.

* * * * *